United States Patent
Juzswik (10) Patent No.: US 9,259,979 B2
(45) Date of Patent: *Feb. 16, 2016

(54) METHOD AND APPARATUS FOR DETERMINING TIRE CONDITION AND LOCATION USING WHEEL SPEED SENSORS AND ACCELERATION SENSORS

(71) Applicant: TRW Automotive U.S. LLC, Livonia, MI (US)

(72) Inventor: David L. Juzswik, Commerce Township, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/558,845

(22) Filed: Dec. 3, 2014

(65) Prior Publication Data

US 2015/0088369 A1    Mar. 26, 2015

Related U.S. Application Data

(63) Continuation of application No. 13/749,128, filed on Jan. 24, 2013.

(51) Int. Cl.
    *B60C 23/04*   (2006.01)

(52) U.S. Cl.
    CPC ......... *B60C 23/0447* (2013.01); *B60C 23/0408* (2013.01); *B60C 23/0416* (2013.01); *B60C 23/0489* (2013.01); *B60C 23/0438* (2013.01)

(58) Field of Classification Search
    CPC ............ B60C 23/0416; B60C 23/0408; B60C 23/0489; B60C 23/0488; B60C 23/0438; B60C 23/0447; G07C 5/008; G07C 5/0808
    See application file for complete search history.

(56) References Cited

U.S. PATENT DOCUMENTS

| | | | |
|---|---|---|---|
| 6,435,020 B1 | 8/2002 | Oldenettel et al. | |
| 6,687,644 B1 | 2/2004 | Zinke et al. | |
| 9,031,738 B2 * | 5/2015 | Juzswik | 701/32.7 |
| 2002/0084896 A1 | 7/2002 | Dixit et al. | |
| 2009/0072958 A1 | 3/2009 | Hammerschmidt et al. | |
| 2010/0161194 A1 | 6/2010 | Turski et al. | |
| 2010/0231403 A1 * | 9/2010 | Bortolin | 340/686.1 |
| 2011/0313623 A1 | 12/2011 | Greer et al. | |

(Continued)

FOREIGN PATENT DOCUMENTS

JP       07069016 A      3/1995

OTHER PUBLICATIONS

European Search Report 13 02 0132 with Written Opinion mailed Jan. 28, 2014.

*Primary Examiner* — Rodney Butler
(74) *Attorney, Agent, or Firm* — Tarolli, Sundheim, Covell & Tummino LLP (57) ABSTRACT

A tire condition sensing apparatus includes a tire-based sensor for sensing two relative rotational positions of its associated tire relative to the earth's horizon as the tire rotates and provides first and second signals indicative thereof. A transmitter for transmits tire condition information and a signal processing time delay value in response to the first and second signals. A vehicle-based sensor monitors tire rotation relative to the vehicle's chassis and provides a signal indicative thereof. A controller for monitors the transmitted tire condition information signal, the signal processing time delay value, and the signal from the vehicle-based sensor and associates tire location in response thereto.

7 Claims, 6 Drawing Sheets

(56) References Cited

U.S. PATENT DOCUMENTS

| | | |
|---|---|---|
| 2012/0025968 A1 | 2/2012 | Maekawa et al. |
| 2012/0112899 A1 | 5/2012 | Hannon |
| 2013/0218364 A1 | 8/2013 | Juzswik |

\* cited by examiner

METHOD AND APPARATUS FOR DETERMINING TIRE CONDITION AND LOCATION USING WHEEL SPEED SENSORS AND ACCELERATION SENSORS

CROSS REFERENCES TO RELATED APPLICATIONS

The present application is a continuation application of U.S. patent application Ser. No. 13/749,128 filed Jan. 24, 2013 entitled METHOD AND APPARATUS FOR DETERMINING TIRE CONDITION AND LOCATION USING WHEEL SPEED SENSORS AND ACCELERATION SENSORS.

TECHNICAL FIELD

The present invention relates to a method and apparatus for determining a time condition and location on a vehicle in a tire pressure monitoring system using wheel speed sensors and acceleration sensors.

BACKGROUND

Systems for sensing tire conditions and displaying sensed tire condition information to a vehicle occupant are known. Often, such systems are known as the pressure monitoring ("TPM") systems even though the system may sense tire conditions in addition to pressure, such as tire temperature. Such TPM systems include a tire-based sensor assembly that senses, for example, the air pressure and temperature inside its associated tire and transmits the sensed tire condition information to a vehicle-based receiver, i.e., a receiver mounted in the vehicle. The transmitted sensed tire condition signal may be a coded radio frequency ("RF") signal. The vehicle-based receiver is connected to a display located in the vehicle cabin so as to display, for example, a warning signal to the vehicle operator when an under-inflated tire pressure condition exists or an over-heated tire condition occurs.

Each tire-based sensor assembly may have a unique identification ("ID") code associate therewith. The tire-based sensor assembly may transmit a signal that includes its associated unique ID code along with the sensed tire condition. The vehicle-based receiver can associate the received tire signal and unique ID with a particular tire location on the vehicle such as front right ("FR"), front left ("FL"), rear right ("RR"), or rear left ("RL"). By associating the tire ID with the tire location on the vehicle, the vehicle-based receiver is able to display the sensed tire condition information at each particular tire location so the vehicle operator can identify which tire (i.e., tire location) has a sensed, improper condition.

Associating a tire location with a tire-based transmitted ID code for each of the tire locations requires a "learning" process by the vehicle-based receiver. Methods have been proposed to accomplish this learning process. The simplest learning system includes preprogramming the vehicle-based receiver with the ID's of each of the tire-based sensors along with their present location. When the tires are rotated or a sensor is replaced, the vehicle-based system must be reprogrammed. Other arrangements have been proposed that automate the learning process. One such system uses localized signal interrogation in which each tire-based sensor assembly includes a receiver that is separately interrogated from a transmitter located outside of the tire using, for example, a localized low frequency ("LF") interrogation signal controlled by the vehicle-based receiver. In response to receiving an interrogation signal, the tire-based sensor assembly transmits a response signal having its unique ID. Upon receipt of the response signal, the vehicle-based receiver associates that unique tire ID with that tire location since the system "knows" which tire location was just interrogated. The vehicle-based system stores tire-based sensor IDs and tire location associations in memory for later use in its display operation. The interrogation process could occur at each vehicle start-up to automatically account for tire rotation and/or sensor replacement.

Some TPM systems have been proposed in which the tire-based system includes a tire rotation sensor that measures wheel rpm's (revolutions per minute). The tire-based system transmits a tire ID, tire rotation rpm values, and tire condition information. Each tire has an associated external wheel rotation sensor that also monitors wheel rpm's. A vehicle-based receiver receives and compares the two rpm values and associates the tire ID with location of the tire in response to matching the rpm values.

U.S. Patent Application 2012/0112899A1 to Hannon and assigned to the same assignee of the present invention discloses a method and apparatus for determining tire condition and location using a tire-based sensor having a unique ID, a tire condition sensor, and further includes an acceleration sensor for sensing when the tire rotates through one of two positions. A wheel speed sensor is connected to a vehicle-based receiver. The vehicle-based receiver associates tire ID with tire location in response to the reception of the tire condition signal and in response to the wheel speed sensor signal.

SUMMARY OF THE INVENTION

The present invention is directed to a method and apparatus for determining a tire condition and location on a vehicle.

In accordance with an example embodiment of the present invention, a tire condition sensing and locating apparatus is provided including a tire-based sensor for sensing two relative rotational positions of its associated tire relative to the earth's horizon as the tire rotates and provides first and second signals indicative thereof. A transmitter transmits tire condition information and a signal processing time delay value in response to the first and second signals. A vehicle-based sensor monitors tire rotation relative to the vehicle's chassis and provides a signal indicative thereof. A controller monitors the transmitted tire condition information signal, the signal processing time delay value, and the signal from the vehicle-based sensor and associates tire location in response thereto.

In accordance with another example embodiment of the present invention, a method is provided for determining a tire condition and location on a vehicle comprises the steps of sensing two relative rotational positions of the tire relative to the earth's horizon as the tire rotates and providing first and second signals indicative thereof, transmitting tire condition information and a signal processing time delay value in response to said first and second signals, monitoring tire rotation relative to the vehicle's chassis and providing a signal indicative thereof, and monitoring the transmitted tire condition information signal, the signal processing time delay value, and the signal from the vehicle-based sensor and associating tire location in response to the thereto.

BRIEF DESCRIPTION OF THE DRAWINGS

The foregoing and other features and advantages of the present invention will become apparent to one skilled in the art upon consideration of the following detailed description of the invention along with the accompanying drawings, in which.

DETAILED DESCRIPTION

Figure 1:
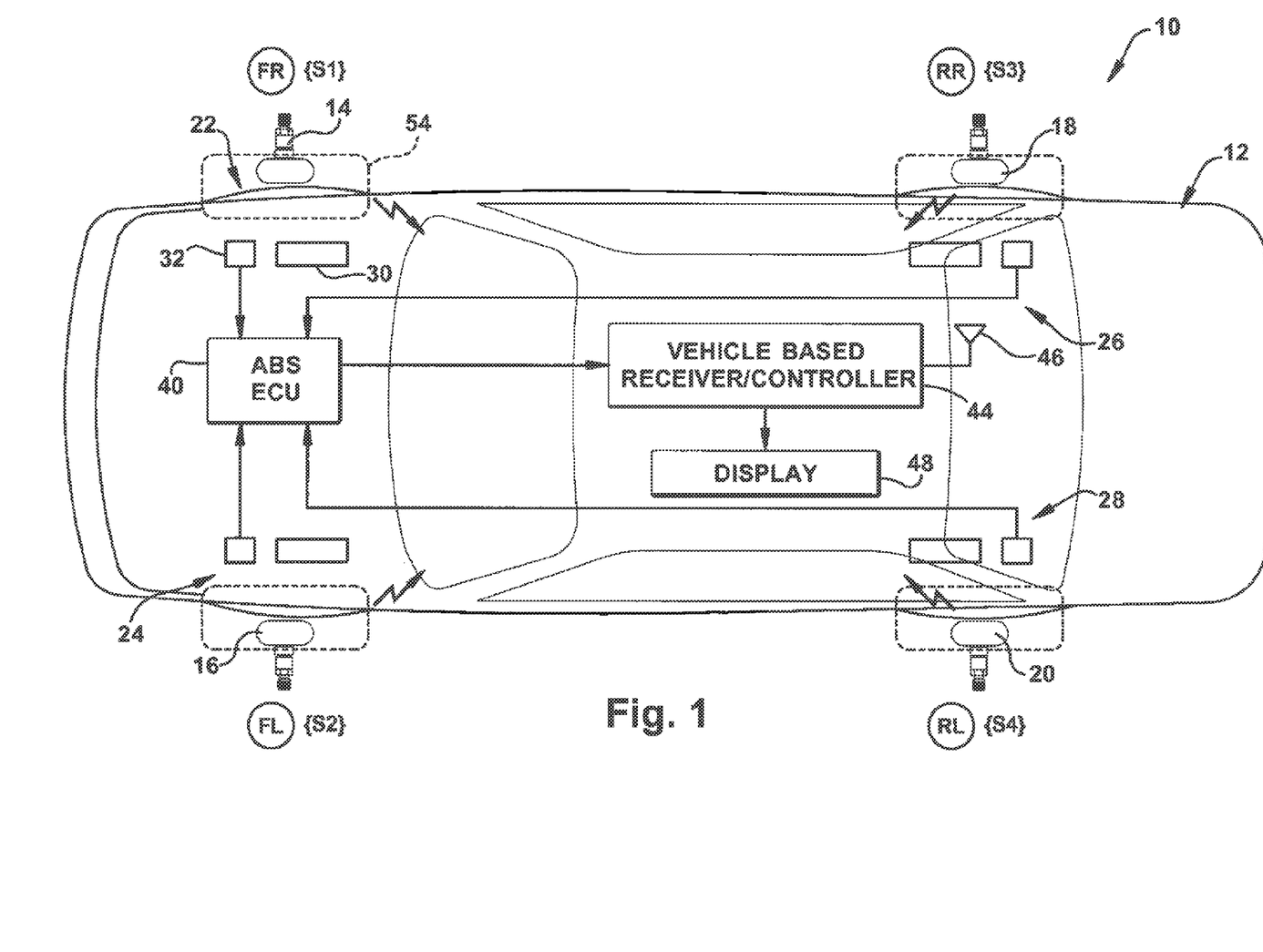
FIG. 1 is a schematic illustration of a vehicle having a tire pressure monitoring system in accordance with an example embodiment of the present invention.

Referring to FIG. 1, a tire pressure monitoring ("TPM") system 10, made in accordance with an example embodiment of the present invention, is shown mounted on a vehicle 12. The TPM system 10 includes a plurality of tire-based sensors 14 ("S1"), 16 ("S2"), 18 ("S3"), and 20 ("S4") located at each of the four corners front right ("FR"), front left ("FL"), rear right ("RR"), and rear left ("RL"), respectively, of the vehicle 12. It should be understood that the tire-based sensors 14, 16, 18, and 20 are mounted inside their associated tires using any of several known arrangements. For example, each of the TPM tire-based sensors can be mounted as part of the valve stem assembly, in a separate housing and attached to the wheel rim, or to the inside wall of the tire itself. Each of the tire-based sensors 14, 16, 18, and 20 include a sensor for sensing acceleration as the tire rotates through the earth's gravitational field and for sensing at least one condition of the tire, such as pressure and/or temperature. The tire-based sensors 14, 16, 18, and 20 each has a unique identification code and each further include a controller for analyzing the tire acceleration during rotation and a transmitter, such as a radio frequency ("RF") transmitter, for transmitting, when the tire acceleration is at one of two possible values, a time delay value, the tire ID, and the sensed tire condition information.

The TPM system 10 further includes wheel rotation sensor assemblies 22, 24, 26, and 28 located at associate FR, FL, RR, and RL corners of the vehicle, respectively, and mounted external of the associated tire at that vehicle corner location. Each external wheel rotation sensor assembly 22 includes a circular toothed plate or disc 30 that is mounted so as to rotate with its associated tire. A sensor 32 is mounted adjacent the disc and senses passing of each tooth of the disc 30 passed the sensor as the tire rotates and provides an electrical signal indicative thereof. Each pulse represents an incremental amount of rotation (360/(# of teeth)). The wheel rotation sensor assemblies 22, 24, 26, 28 may be part of the vehicle's anti-lock braking system ("ABS") and may be referred to as wheel speed ("WS") sensors. Each sensor 32 of the wheel rotation sensor assemblies is connected to an ABS electronic control unit ("ECU") 40.

The TPM system 10 further includes a vehicle-based receiver/controller 44. The receiver/controller 44 is connected to the ABS ECU 40 and receives wheel rotation signals for each of the wheels. Since the sensor 32 is fixed to the vehicle chassis, it should be appreciated that the relative incremental angular rotation of the disc (and in effect, the tire) sensed by the sensor 32 is relative to the chassis.

The vehicle-based receiver/controller 44 also includes a receiving antenna 46 for receiving RF signals from each of the tire-based sensors 14, 16, 18, and 20. The vehicle-based receiver/controller 44 is connected to a display 48 for displaying sensed tire condition information for each of the tires at each of the vehicle corners. The display 48 can take any of several known forms including a liquid crystal display ("LCD").

The system will be better appreciated with reference to FIGS. 2-5. With specific reference to FIG. 2, a tire 54 located at the FR corner of the vehicle includes the TPM tire-based sensor 14, having a unique ID, operatively mounted to the tire 54 for sensing tire acceleration through the earth's gravitational field and for sensing a tire condition (e.g., pressure and temperature). The wheel rotation sensor 22 associated with the FR corner has its toothed disc 30 mounted so as to rotate with the tire 54. The sensor 32 is mounted adjacent the disc and provides an electrical signal indicative of each tooth of disc 30 passing by the sensor 32. In accordance with one example embodiment of the present invention, the toothed disc has a plurality of teeth 56 equally spaced about the disc 30. Each time a tooth passes the sensor 32, a pulse is provided. Each tooth pulse (e.g., a square wave) has a rising edge and a falling edge. The ABS ECU 40 can count the rising edges, the falling edges, or both. The pulse count will be consistent for each complete rotation of the tire 54. Any of several types of sensors could be used for sensor 32 including an inductive sensor, a Hall Effect sensor, etc.

Figure 2:
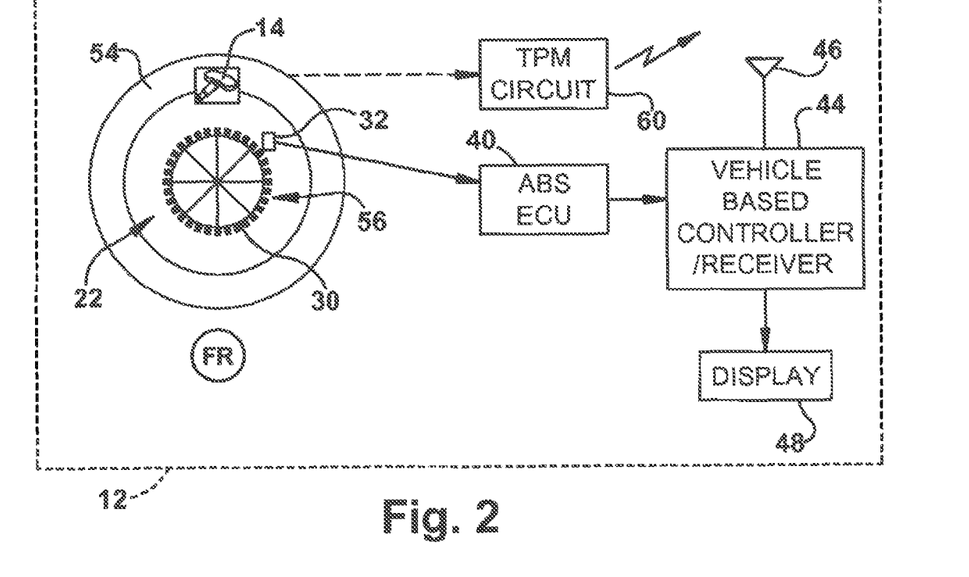
FIG. 2 is a schematic block diagram of the tire pressure monitoring system of FIG. 1 showing the sensor arrangement associated with one of the tires in greater detail.

The output from the sensor 32 is connected to the ABS ECU 40. As mentioned, the ABS ECU 40 monitors the output of the sensor 32 and periodically provides a current pulse count value. Again, the sensor 32 is fixed relative to the chassis of the vehicle so any pulse count is indicative of rotation relative to the vehicle chassis. The ABS ECU 40 receives a continuous stream of pulses when the tire 54 is continuously rotating during normal vehicle movement. The ABS ECU 40 is connected to the vehicle-based TPM receiver/controller 44. In accordance with one example embodiment of the present invention, the ABS ECU 40 will receive and send the wheel counts from all four of the tires in a single message to the vehicle-based controller 44. The vehicle-based controller 44 will time stamp the count values received from the ABS ECU 40 and keep a history of past ABS received count values for each of the four vehicle corners. For example, the pulse count history could be one second in depth. The determination of the amount of notation of each of the wheels could be performed by the vehicle-based controller 44. It should be appreciated there is no determination of an absolute angular reference for any of the tires. Only a relative rotational reference is needed with the relative rotation being represented by a count value.

Figure 3:
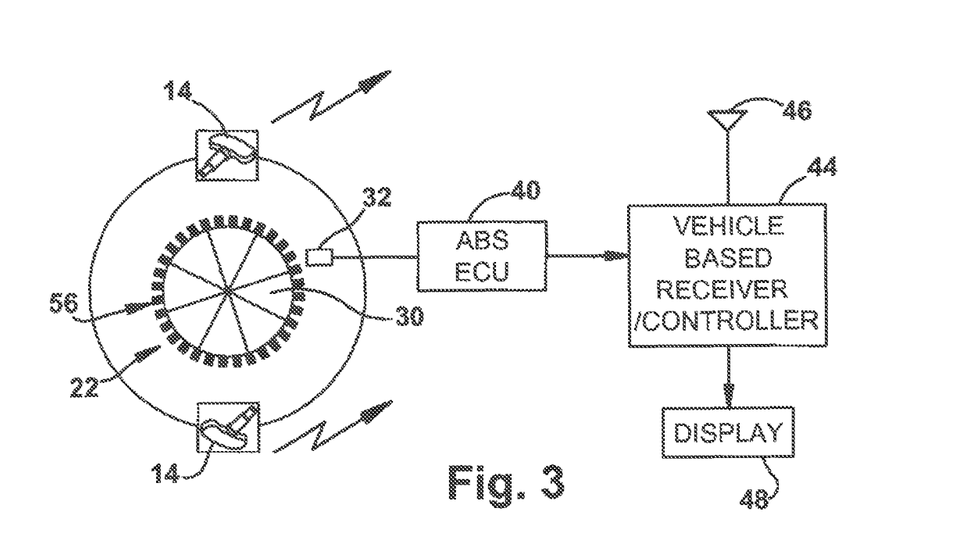
FIG. 3 is a schematic illustration of the tire pressure monitoring system of FIG. 2 showing the tire-based sensor at two rotational positions where signal transmission could occur.

The tire-based sensor 14 includes a TPM circuit 60 that includes the unique ID, the tire condition sensor, and a tire rotation sensor. Although shown external of the tire-based sensor 14, the TPM circuit 60 is, in accordance with one example embodiment of the present invention, located within the housing of the tire-based sensor 14. The tire-based sensor 14 senses acceleration. Based on the sensed acceleration, at least two predetermined positions of the tire 54 can be identified as the tire rotates through the earth's gravitational field relative to the horizon of the earth. Identification of these two predetermined positions is used to trigger the TPM transmitter. As shown in FIG. 3, an example embodiment of the present invention is shown in which the tire-based sensor 14 transmits its tire condition RF signal at two separated rotational positions of the tire 54 relative to the earth's horizon during normal vehicle movement.

Figure 4:
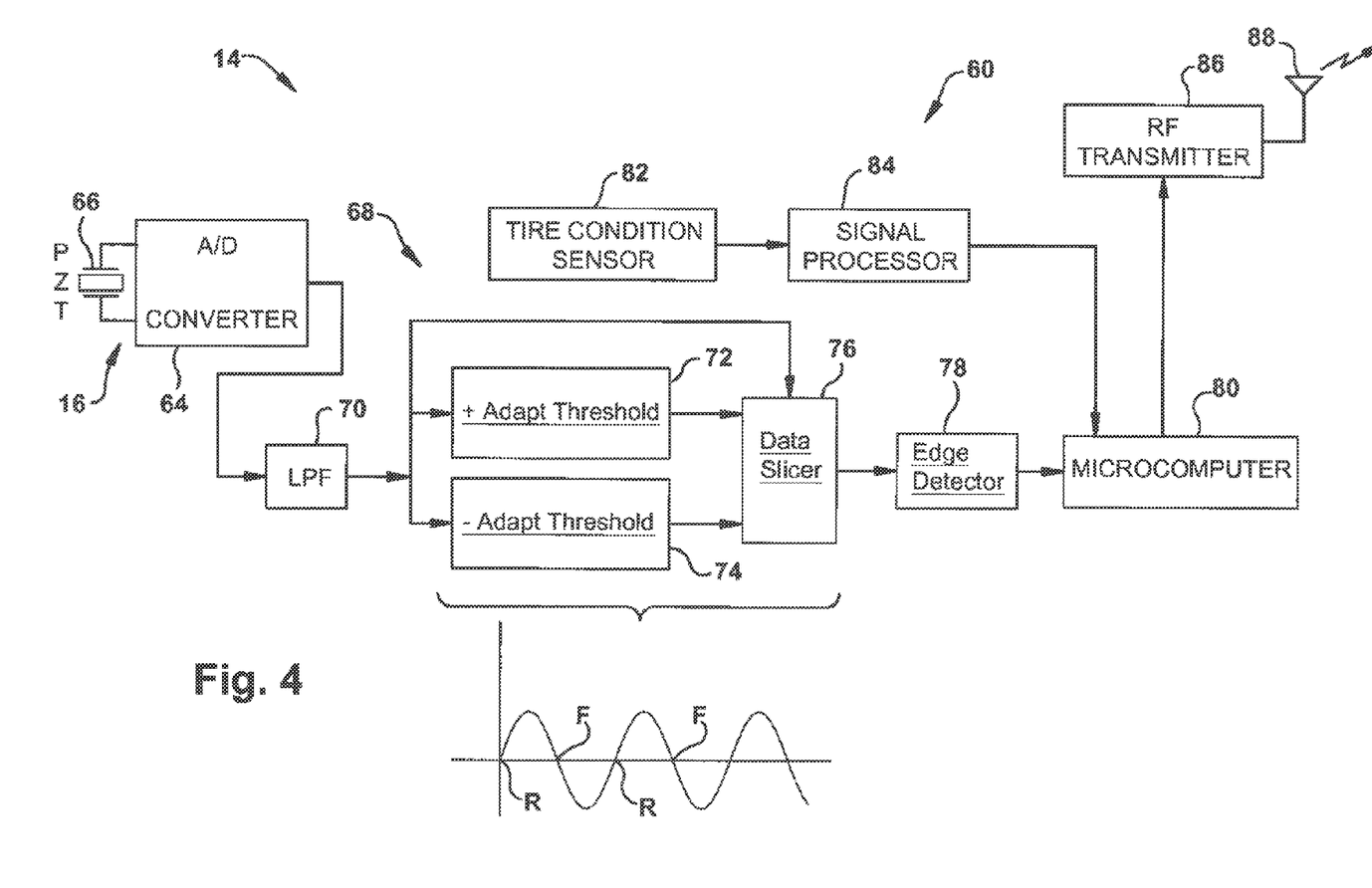
FIG. 4 is a schematic block diagram of the tire-based sensor unit in accordance with an example embodiment of the present invention.

Referring to FIG. 4, the tire-based sensor 14 includes the TPM circuit 60. Those skilled in the art will appreciate that the control functions of the TPM circuit 60 could be accomplished using a controller, such as a microcontroller, by using discrete circuitry, a combination of different types of circuitry, or an application specific integrated circuit ("ASIC") and can be embodied in either the analog or digital domain. Each of the tire-based sensors 14, 16, 18, 20 is constructed and operates in a similar manner and, for simplicity, only sensor 14 at the front right corner of the vehicle is described in detail.

The tire-based sensor 14 includes an accelerometer 66 such as a piezoelectric transducer ("PZT"). The accelerometer 66 provides or generates a voltage that changes with force as the tire 54 rotates. Two forces that the accelerometer 66 experiences during tire rotation are centripetal force and the force of the earth's gravitational field. As the accelerometer 66 travels in a circle during one tire rotation, it will experience the earth's gravitation force change from +1G to −1G in a sinusoidal pattern over one rotation of the tire. The centripetal force will either be of a consistent level when the vehicle is traveling at a constant velocity, or will be slowly changing with changes in vehicle speed, in comparison to the change in the earth's gravitational force during rotation.

The accelerometer sensor 66 is connected to an Analog-to-Digital Converter ("ADC") 64. The output of the ADC 64, representing the sampled acceleration signal, is connected to a low pass filter ("LPF") 70 that can be embodied as hardware or the function accomplished in software. The LPF 70 aids in removing road noise from the accelerometer signal. The output of the LPF 70 is compared against a plus adaptive threshold value in comparator 72 and a minus adaptive threshold value in comparator 74 and provides a signal reference level for use in a data slicer 76. The data slicer 76 converts the analog signal into a digital signal (0 or 1). Edge detector circuit 78 detects the rising ("R") and falling ("F") edge of the signal output from the accelerometer 66 so as to indicate (i.e., identify) a first predetermined angular position of the sensor (and, in turn the tire) relative to the earth's horizon and a second predetermined angular position of the sensor (and, in turn, the tire) relative to the earth's horizon as the tire rotates. The angular separation between the acceleration sensor signal rising edge and the acceleration signal falling edge (again, relative to the earth's horizon) are, by way of example, set at approximately 180 degrees apart. Those skilled in the art will appreciate that other angles could be selected so that the angular change between the rising edge detection and the falling edge detection can be as desired. Whatever relative angle is selected, the angular separation will remain constant during each revolution of the tire. The output of the edge detector 78 is connected to a microcomputer 80. The LPF 70, threshold comparators 72, 74, data slicer 76, and edge detector function 78 could be embodied in software within the microcomputer 80.

It should be appreciated that the signal processing that occurs in the low pass filter 70, the threshold comparators 72, 74, the data slicer 76, and the edge detector 78 takes a certain amount of time referred to herein as "signal processing time delay." Once the acceleration signals are processed so as to determine that the threshold value (detection of the occurrence of either a desired rising edge or falling edge value) has been crossed by the value of the acceleration signal, the angular position of the rotating tire, as represented by that acceleration signal crossing, has already passed that position. Any time delay between the actual threshold crossings and processing of the threshold crossing events amounts to a relative rotational position error value. The amount of the error value is dependent on many factors including the filter rate. In accordance with the present invention, the tire-based sensor, via the microcomputer 80, calculates this signal processing time delay and stores that determined time delay value for transmission to the vehicle-based receiver/controller 44.

It should be further appreciated that the sensor processing shown in FIG. 4 could also be accomplished by other means other than use of a data slicer and could have, instead, used discrete frequency processing. Also, as mentioned, the two sensed rotational positions do not have to be 180 degrees apart. The 180 degree value used in this description represents one example embodiment of the present invention.

The tire-based sensor 14 further includes, in accordance with an example embodiment of the present invention, a tire condition sensor 82 for sensing tire pressure and/or tire temperature. The output of the tire condition sensor 82 is connected to a signal processor circuit 84 that converts the signal from the sensor 82 into a digital format and places the information into a digital packet or word for ultimate transmission having information regarding the sensed tire condition. The output of the signal processor 84 is connected to the microcomputer 80.

The microcomputer 80 has stored in its internal memory its associated, unique ID, e.g., sensor ID=S1 in this example. As mentioned, each tire has its associated unique tire ID. The microcomputer 80 assembles the digital information packet or word for transmission that includes the sensed tire condition, the associated ID, and the calculated processing time delay information, i.e., the time necessary from processing the rising and falling edge detection values. The microcomputer could additionally include other data as part of the information packet if desired such as a wake-up portion, a check-sum portion, etc. The microcomputer 80, however, does not include as part of the information packet any angle information from the sensor 66 of the tires position relative to the vehicle chassis or relative to the earth's horizon. The output of the microcomputer 80 is connected to an RF transmitter circuit 86 for transmission of the information packet having the tire condition information via antenna 88.

Figure 5:
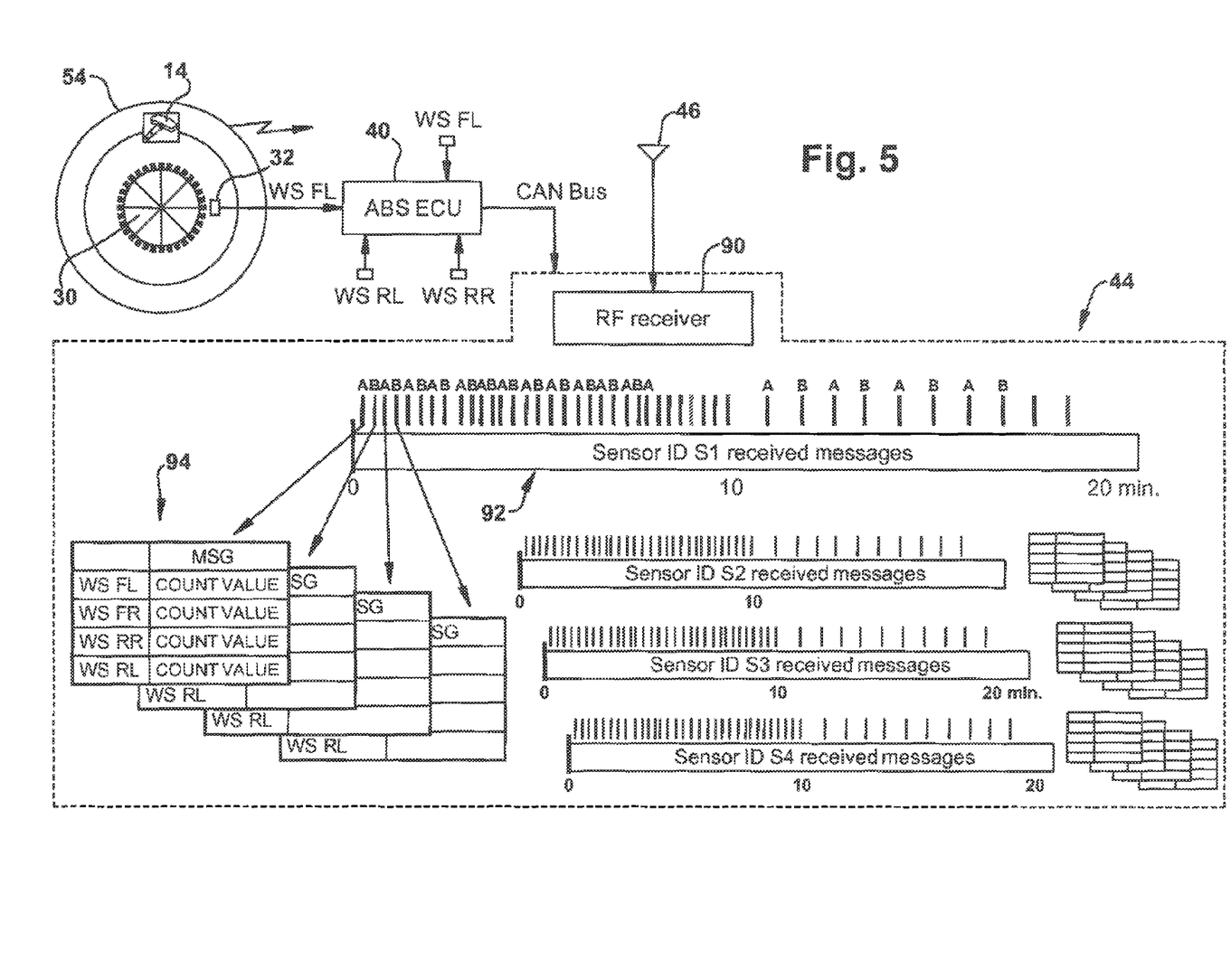
FIG. 5 is a functional block diagram of the tire pressure monitoring system of FIG. 1 showing the vehicle-based receiver in further detail in accordance with an example embodiment of the present invention.
Figure 6:
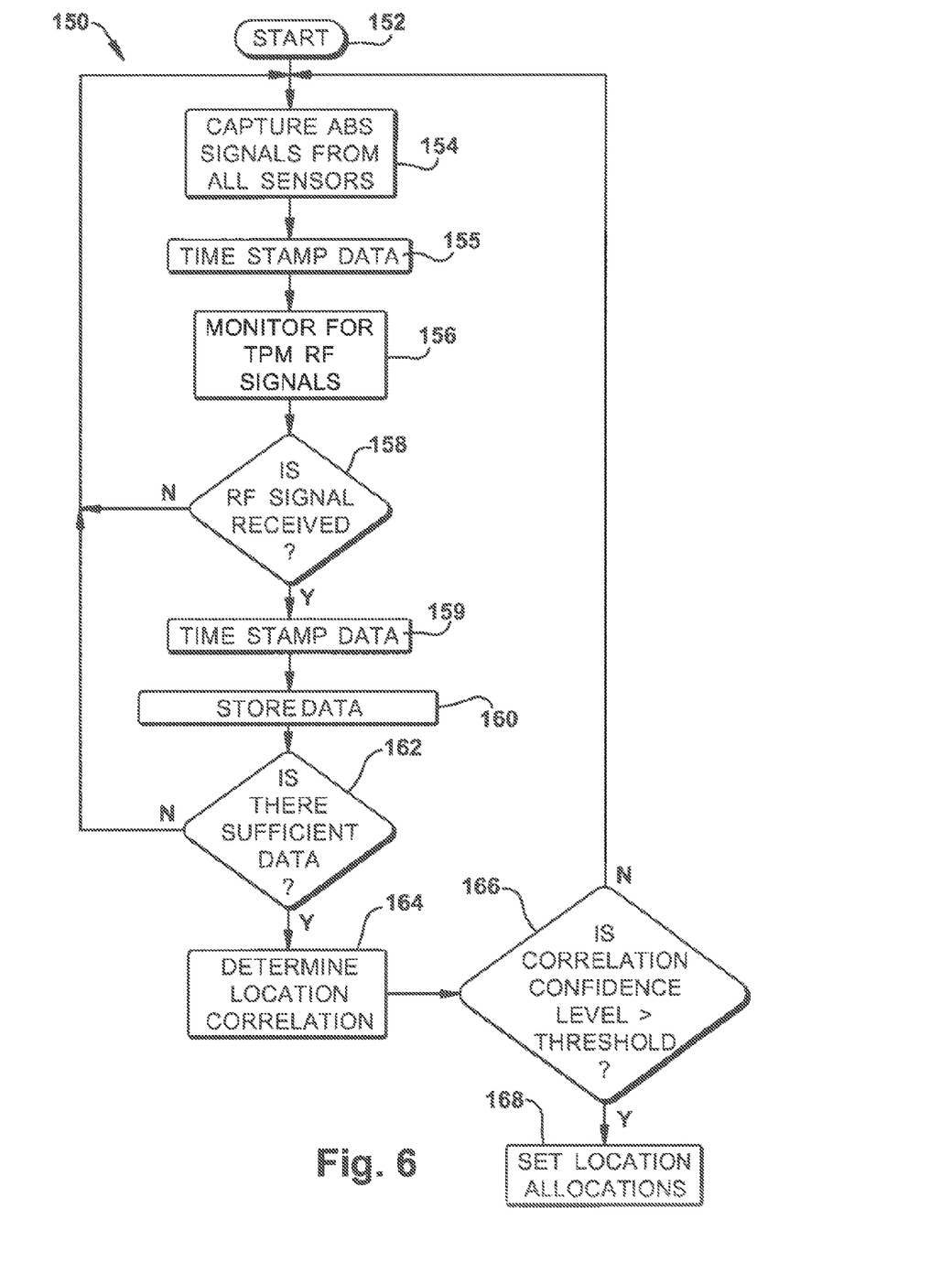
FIG. 6 is a flow chart depicting a control process in accordance with an example embodiment of the present invention to correlate each tire-based sensor location with tire location on the vehicle.
Figure 7:
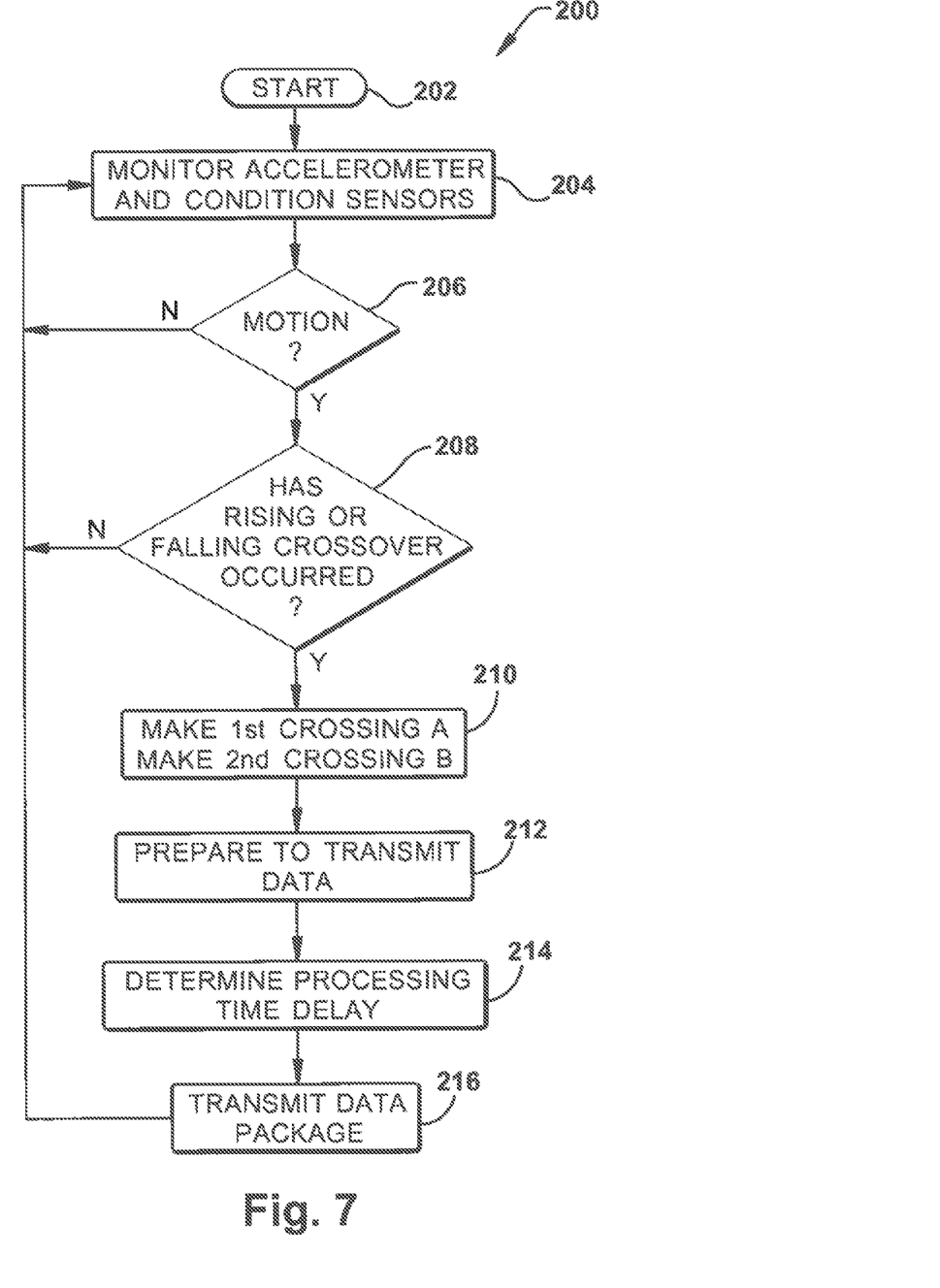
FIG. 7 is a flow chart depicting a control process in accordance with an example embodiment of the present invention showing the control method of the tire-based sensor.

Referring to FIGS. 5-7, the operation of the vehicle-based receiver/controller 44 will be appreciated as well as the transmission control followed by the tire-based sensor 14. The vehicle-based receiver/controller 44 is connected to the output of the ABS ECU 40 via an appropriate connection such as the vehicle's controller-area network bus ("CAN-bus"). The vehicle-based receiver/controller 44 monitors the angular rotation of each of the wheels of the vehicle via the sensor 32 and toothed disc 30 associated with each wheel, i.e., monitors each of the wheel speed sensors 22, 24, 26, 28 also designated as WS FR, WS FL, WS RR, and WS RL, respectively. The vehicle-based receiver/controller 44 also includes an RF receiver 90 connected to the antenna 46 for receiving and demodulating the tire condition information, the tire ID, and the time delay value from each of the transmitters associated with the tire-based sensors 14, 16, 18, and 20.

The received signals from each of the tire-based units is referred to herein as message A when the wheel or tire rotation is at the first position (one of the rising or falling edge) and message B when the wheel or tire rotation is at the second position (the other of the rising or falling edge), which, in accordance with an example embodiment, is approximately 180 degrees apart. The transmitted signals are assigned a bin A or a bin B designation. Whichever crossing, whether a rising edge or a falling edge is first detected, it is assigned the bin A designation with the second being assigned the bin 13 designation.

An event graph 92 represents the occurrence of received tire condition signals from one of the tire-based unit such as tire-based sensor 14 ID S1. When each tire condition signal is received, the receiver/controller 44 counts the number of ABS ECU pulses or the amount of angular rotation that occurred from the previous received tire condition signal. The received wheel position information from the ABS ECU 40 (whether pulsed or angular values) is time stamped when it is received. The amount of relative angle motion can be determined by keeping a count of the pulses from each wheel speed sensor. Similarly, all of the transmissions received from the tire-based sensor 14 are time stamped. The tables 94 are the rotational count values for the four wheels as detected by the ABS wheel speed sensor corresponding to the same time stamped transmissions received from sensor 14. These count values are stored in memory. Similarly, the wheel speed count values are stored for each of the tire-based units S2, S3 and S4.

The transmission of the signals from each tire-based unit, as mentioned, is controlled by the sensor's associated microcomputer 80. The microcontroller 80 "knows" when tire rotation is occurring from the signal from the acceleration sensor. During a first ten minute period after initial tire rotation begins, it may be desirable to transmit a tire condition signal forty times. During forty predetermined time slots over the ten minute period, the microcontroller 80 monitors the tire condition sensor 82 and transmits a tire condition signal when the edge detector indicates the tire has reached the rising edge or falling edge position plus transmits the time delay value it calculated due to signal processing. The microcomputer can transmit the tire condition signal in any of several patterns in response to crossing the rising edge threshold and the falling edge threshold during tire rotation. However, there is no definition of tire angle being either position A or position B. In one series of transmissions, the rising edge crossing may be classified as position A and the falling edge crossing as position B. In a different transmission sequence, the rising edge crossing may be classified as position B and the falling edge crossing as position A. The tire-based system, in accordance with one example embodiment of the present invention, is set up so that the first transmission, whether corresponding to a crossing of the rising or falling edge, is called transmission A and the second crossing (the other of the rising or falling edge) is called transmission B. It should be clear that the transmission of a signal from the tire-based sensor is no indication of a particular angular position of the the either relative to the earth's horizon or the vehicle chassis. The only information needed by the vehicle-based receiver/controller 44 is that predetermined A and B positions have been reached during the rotation so that the wheels speed data (relative angular rotation) can be used for correlation, i.e., associating of tire ID with a particular corner location. The time stamping of data and the time delay information compensates for system variances.

The receiver/controller 44, after a sufficient amount of data is collected (sufficient numbers of tables 94 are filled), determines which relative tire angular positions correlate the best with having received tire condition signals that would have occurred at A and B positions by processing data from the same time stamp grouping and taking into account the calculated time delays in the tire-based sensor. Assume that the microcontroller 80 was controlling the transmitter 86 to transmit in an A, B, A, B, pattern and the edge detectors are 180 degrees apart relative to the earth's horizon. Also assume that the table 94 indicates that the FR ABS wheel speed sensor (WS FR) measured a count value change indicative of 180 degrees between transmissions taking into account time delay values, each time a tire condition signal had a S1 ID. Then, the receiver could assume that the tire ID S1 is located at the FR corner of the vehicle. Once tire condition data correlates with a confidence level above a predetermined threshold, that tire ID for that tire location is stored in an internal memory of the receiver/controller 44 for later use in identifying the tire location when tire condition information is to be displayed on the display 48, e.g., an under inflated tire occurrence. The confidence level can be determined by several different methods. One example is to determine that the WS angle data in a table does not vary over a predetermined number of samples by more than a predetermined amount.

Once the sensor ID's are correlated with the corner locations, the pressure/temperature information portion of the transmitted signal is monitored for each of the sensors, and the tire condition information can be displayed along with the associated determined tire location information for the vehicle operator. As those skilled in the art will appreciate, the display of tire condition information can be limited only to abnormal the conditions or can be continuous tire pressure and temperature information if so desired.

Referring to FIG. 6, a flow chart is shown depicting a control process 150 in accordance with an example embodiment of the present invention for determining lire location in a TPM system. The process starts at step 152 where initial conditions, flags, appropriate values, etc., are set. At step 154, the ABS signals indicative of the wheel angular rotation from each of the vehicle tires is continuously captured and provided to the receiver/controller 44. The received data is time stamped in step 155. In step 156, the receiver/controller 44 monitors for received RF tire condition information signals from the tire-based units. In step 158, a determination is made whether RF signals have been received. If negative, the process loops back to step 154 where wheel angular position from the ABS wheel speed sensors is continued to be captured. If the determination in step 158 is affirmative, the received RF data is time stamped in step 159. In step 160, the wheel data from all four wheels are temporarily stored (table 94). In step 162, a determination is made as to whether there has been a sufficient amount of data collected to make a location determination. For example, it may be desired to have 10-20 samplings of data before a location determination is made. If there is not enough data, the process loops back to step 154 until a sufficient amount of data is received and stored.

In step 164, a determination of wheel location is performed by correlating the angular wheel position data from the wheel speed sensors that best corresponds in the event of the received tire condition signals taking into account the time delay values, e.g., wheel FR rotates 180 degrees each time a tire condition signal having S1 ID is received therefore correlating S1 with the FR location. In step 166, a determination is made as to whether the determined tire location correlation has a confidence value greater than a predetermined value. Assuming that the confidence level of the determination is sufficient, the tire-based unit ID and determined tire location information is stored in memory in step 168. If the confidence value is not greater than a predetermined level, no location information is stored, the process loops back to step 154, and any previous stored location information is retained. The vehicle-based unit 44 correlates the sensors S1, S2, S3, and S4 with tire locations FR, FL, RR, and RL on the vehicle.

Referring to FIG. 7, the control process 200 followed by the tire-based sensor is shown. The process starts in step 202 where initial conditions, flags, appropriate values, etc., are set. In step 204, the output of the acceleration sensor is monitored. In step 206, it is determined whether the vehicle is moving based on the acceleration signal. If there is no motion detected, the process loops back to step 204. If there is vehicle motion, the process determines if a rising edge or a falling edge crossing has occurred in step 208. If the determination in step 208 is negative, the process loops back to step 204 where the acceleration sensor is continued to be monitored. If, in step 208 a rising or falling edge crossing has occurred, (i.e., an associated threshold value has been reached), the first detected occurrence, whether a rising or falling edge is classified as localization position A. The next crossing event (i.e., the other of the rising or falling edge) is classified as localization position B in step 210. In step 212, the tire-based controller prepares to transmit a data message. Before the date message can be transmitted, the process determines in step 214 a time delay value that represents the time delay between the detection of the rising or falling edge crossing until the actual transmission of the data massage will occur. Once the time delay value is determined in step 214, the data packet is assembled and transmitted in step 216. The message packet from the tire-based sensor will include the tire ID, the time delay value, and the tire condition information.

Signal filtering is required even on smooth road surfaces. Both passive and adaptive digital filtering techniques can be used to smooth the signal over the frequency range of three to twenty Hertz without undue signal attenuation or use of battery energy.

From the above description of the invention, those skilled in the art will perceive improvements, changes and modifications. For example, it is contemplated that the tire-based sensors could communicate via RF to the ABS ECU and that the ABS ECU could perform the correlation of tire-based units with vehicle corner location. Such improvements, changes, and/or modifications within the skill of the art are intended to be covered by the appended claims.

The invention claimed is:

1. A tire condition sensing apparatus comprising:
a tire-based acceleration sensor for sensing two relative rotational positions of an associated tire relative to the earth's horizon as the tire rotates and providing first and second acceleration signals indicative of sensed acceleration;
transmitter for transmitting signals from the tire including a tire identification, tire condition information, and a processing time delay value in response to each of said first and second acceleration signals, wherein the processing time delay represents the time delay in processing the first and second acceleration signals during tire rotation;
a vehicle-based sensor for monitoring tire rotation relative to the vehicle's chassis and providing a signal indicative of said tire rotation; and
a controller for monitoring the transmitted tire identification signal, the processing time delay value, and the signal from the vehicle-based sensor and associating tire identification with a tire location in response.

2. The apparatus of claim 1 wherein the tire-based sensor senses two relative rotational position that are 180 degrees apart.

3. The apparatus of claim 1 wherein the tire-based sensor includes an accelerometer used for sensing the relative rotational positions.

4. The apparatus of claim 1 wherein said vehicle-based sensor includes a toothed disc mounted for rotation with the tire and an inductive sensor mounted adjacent the toothed disc and inductively coupled to the toothed disc.

5. A method for sensing condition of a tire comprising the steps of:
sensing two relative rotational positions of the tire relative to the earth's horizon as the tire rotates using acceleration sensors and providing first and second acceleration signals indicative of sensed acceleration;
transmitting signals from the tire including tire identification, tire condition information, and a signal processing time delay value using a transmitter in response to said first and second acceleration signals, wherein the processing time delay represents the time delay in processing the first and second acceleration signals during tire rotation;
monitoring tire rotation relative to the vehicle's chassis using a vehicle-based sensor and providing a signal indicative of said tire rotation; and
monitoring the transmitted tire identification, tire condition information, the signal processing time delay value, and the signal indicative of the tire rotation relative to the vehicle's chassis using a controller, said controller associating tire identification with a tire location in response.

6. A tire condition sensing apparatus for sensing and transmitting tire condition and identification information, the apparatus comprising:
a toothed disc mounted for rotation with a vehicle tire;
a disc rotation sensor for providing a pulse signal each time a disc tooth passes the disc rotation sensor;
an acceleration sensor mounted for rotation with the tire for producing a sinusoidal signal as the tire rotates through the earth's gravitation field;
a tire-based controller for processing the acceleration signal to determine two predetermined locations of the sensor relative to the earth's horizon as the tire rotates and determine any time delay in performing said processing;
a sensor for sensing the tire condition;
a transmitter for transmitting a message packet that includes a tire identification and a tire condition when the tire-based controller determines the acceleration sensor is at the predetermined locations relative to the earth's horizon along with any determined time delay; and
a vehicle-based controller for monitoring the disc rotation sensor and the transmitted message packets, correlating an angular position of the disc in response to the transmitted message packets, and associating the tire identification with a tire location.

7. The tire condition sensing apparatus of claim 6 further including a low pass filter for filtering the signal from the acceleration sensor, a vehicle speed sensor, and wherein the tire-based controller adjusts the operation of the low pass filter in response to sensed vehicle speed.

* * * * *